(12) United States Patent
Zoppas et al.

(10) Patent No.: US 7,775,786 B2
(45) Date of Patent: Aug. 17, 2010

(54) HEATED BLOW MOULD FOR THERMOSTABILIZING TREATMENT

(75) Inventors: Matteo Zoppas, Fontana Fredda (IT); Alberto Armellin, Vittorio Veneto (IT); Giovanni Chiarotto, Cordenons (IT); Michele Varaschin, Cozzuolo (IT)

(73) Assignee: S, I.P.A. Societa Industrializzione Progettazione e Automazione S.p.A. (IT)

( * ) Notice: Subject to any disclaimer, the term of this patent is extended or adjusted under 35 U.S.C. 154(b) by 752 days.

(21) Appl. No.: 10/572,531

(22) PCT Filed: Sep. 17, 2004

(86) PCT No.: PCT/EP2004/052235

§ 371 (c)(1), (2), (4) Date: Mar. 17, 2006

(87) PCT Pub. No.: WO2005/025835

PCT Pub. Date: Mar. 24, 2005

(65) Prior Publication Data

US 2007/0031531 A1 Feb. 8, 2007

(30) Foreign Application Priority Data

Sep. 17, 2003 (IT) .................. RM2003A0429

(51) Int. Cl.
*B29C 49/64* (2006.01)
(52) U.S. Cl. ......................... 425/526; 249/78
(58) Field of Classification Search ................ 425/526; 249/78

See application file for complete search history.

(56) References Cited

U.S. PATENT DOCUMENTS

| 3,880,973 | A | * | 4/1975 | Yoshikawa et al. | ........... 264/521 |
| 4,839,127 | A | * | 6/1989 | Ajmera et al. | .............. 264/526 |
| 2005/0006380 | A1 | * | 1/2005 | Kagan | ......................... 219/661 |
| 2006/0219709 | A1 | * | 10/2006 | Kagan | ......................... 219/661 |

FOREIGN PATENT DOCUMENTS

JP 08174552 A * 7/1996

* cited by examiner

*Primary Examiner*—Robert B Davis
(74) *Attorney, Agent, or Firm*—Lorusso & Associates

(57) ABSTRACT

A heated blow mold for the thermostabilizing treatment, or the heat-set process, where at least a heating system is housed between the mold (2) and mold holder (3). Said system consists of a set of tubular electric resistors, which are parallel to the generator of the mold and of the item to be molded, connected to each other by additional electric resistors, which are basically transversal in relation to the first resistors and placed in areas requiring greater heat.

6 Claims, 3 Drawing Sheets

HEATED BLOW MOULD FOR THERMOSTABILIZING TREATMENT

TECHNICAL FIELD

This invention relates to a heated blow mould for the thermostabilizing treatment or the heat-set process. More specifically, K relates to a blow mould where the heating element consists of at least a set of tubular electric resistors connected to each other.

BACKGROUND ART

Today, plastic containers in different shapes and sizes—for example, bottles—are often made with a process comprising a blow moulding stage wherein the thermoplastic material, possibly in the form of a preform (i.e. a smaller, pre-moulded workpiece that is normally cylindrical in shape), is blow moulded in a heated mould to create the final container.

To date, two general known systems are used to heat the mould: the first uses film electric resistors placed near the inside surface of the mould, and the second uses a heating element consisting of a hot fluid that circulates in a coil placed in the mould.

Although the heating system with film electric resistors (described, for example, in U.S. Pat. Nos. 5,007,818 and 5,234,637) has excellent temperature modulation properties, it has a poor heating value. As a result, this type of heating system must be placed as near as possible to the surface of the mould that comes into contact with the material to be moulded. The drawback of this requirement is that it is necessary to have several moulds (i.e. one for each type of container or bottle to be moulded) equipped with a blanket of film electric resistors near the work surface; obviously, this increases costs.

The heating system with the circulating hot fluid has greater thermic inertia than the other system, although it has a good heating value. Furthermore, in today's rotary moulding machines, it presents significant problems in terms of assuring the watertightness of the location where the fixed and the rotary parts come into contact and of the ducts that convey the hot fluid, generally oil, to the mould, which opens to house the preform and closes to unload the finished product at high rates. These requirements add bulk to the machine and, thus, mean larger dimensions and higher costs. Another drawback is the poor thermal efficiency due to the dissipation of the thermal power in the rotary device since it is not possible to prevent the ducts for delivering the hot fluid from being far away from those for removing the cold fluid.

Today, thus, there is a need for a mould heating system for use in rotary blow moulding machines that is simple and effective.

OBJECTS AND BRIEF DESCRIPTION OF THE INVENTION

It is an object of this invention to provide a single electric heating system that resolves the aforementioned problems and is suitable for use with any type of container or bottle, easy to control, and energy efficient.

The blow moulding device in accordance with this invention consists of a single mould holder that houses, each time, the mould specific to the container (for example, a bottle) to be made. Furthermore, the device consists of a heating system that is housed between the mould holder and mould. Said system consists of at least a set of tubular electric resistors, which are placed parallel to each other and the generator of the container or bottle, and of other electric resistors, which are normally placed transversal to said first resistors and in areas where more power is dissipated or at least in areas requiring more electric power. Said tubular electric resistors can be connected electrically to said additional electric resistors.

If necessary, at least one of said sets of tubular electric resistors can be placed nearer the inside surface of the mould holder that is in contact with the mould.

At least another of said sets of electric resistors can be placed nearer the outside surface of the mould holder in order to limit the outward dispersion of heat, insuring greater thermal uniformity inside the mould. A layer of thermally insulating material can be used in order to limit further useless and costly losses of heat in the environment.

DETAILED DESCRIPTION OF THE INVENTION

Other objects and advantages of the invention shall be readily apparent from this more detailed description of the currently preferred versions of the invention, given as non-limiting examples of the scope of the invention and in conjunction with the accompanying schematic drawings.

In the blow moulding machines suitable for the device in accordance with the invention, the moulds are of the split-mould kind (i.e. divided into two symmetrical halves) that open to house the preform and unload the moulded product and close and are clamped tightly during moulding.

Only one of said halves is shown in the figures, since it is taken for granted that the other half is perfectly symmetrical. This symmetry is limited to the geometry. In practice, since heat exchanges with the outside environment are typically asymmetrical, power must be supplied in an asymmetric way for the two mould halves to have a thermal symmetry; this supply is managed automatically by the control system. The results of the thermostabilizing treatment is to obtain uniformity throughout the surface of the container, even if the shape of the container is not symmetrical (for example, containers with handles).

Figure 1:
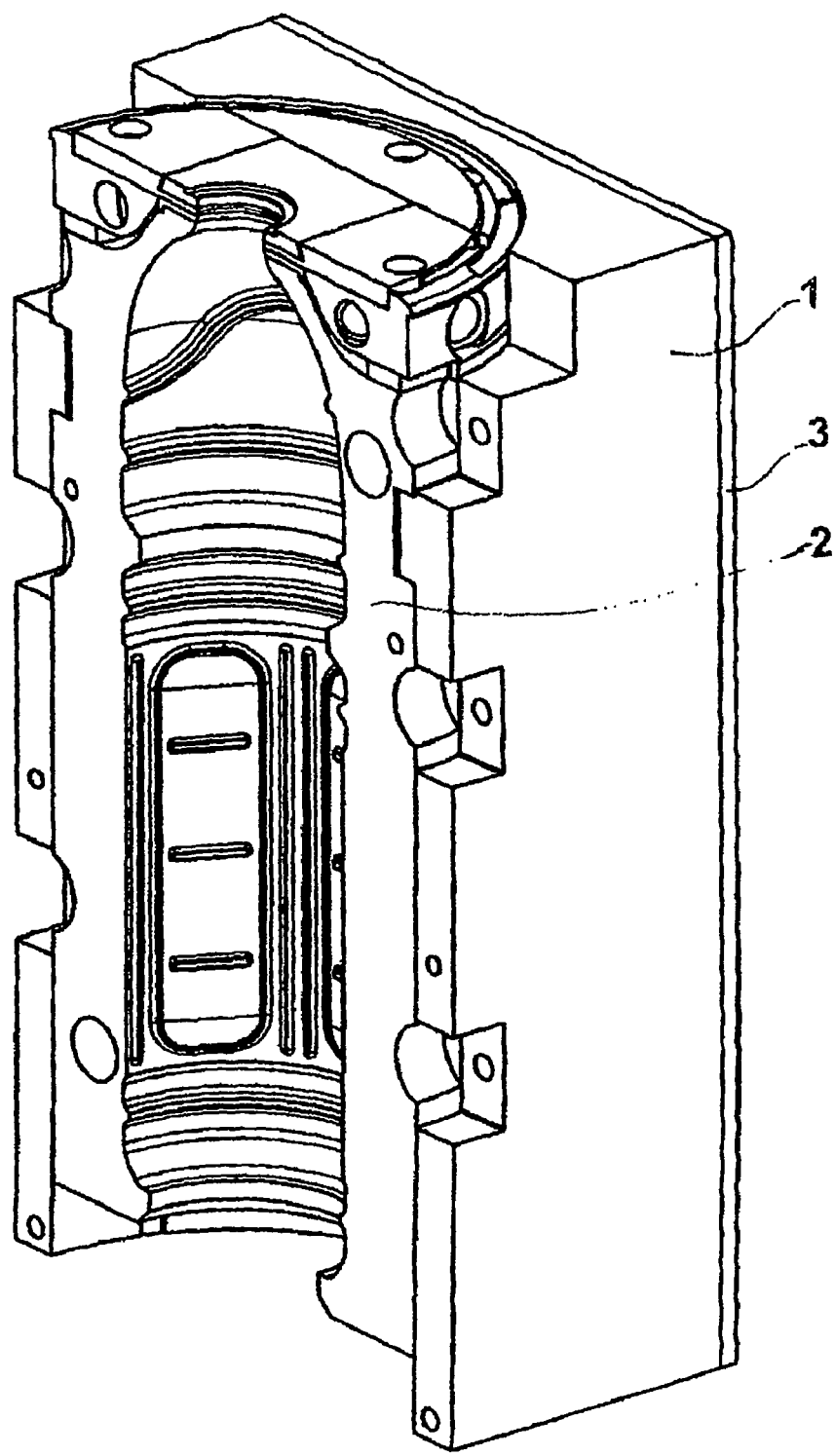
FIG. 1 shows a perspective view of half the mould holder and mould assembly.
Figure 2:
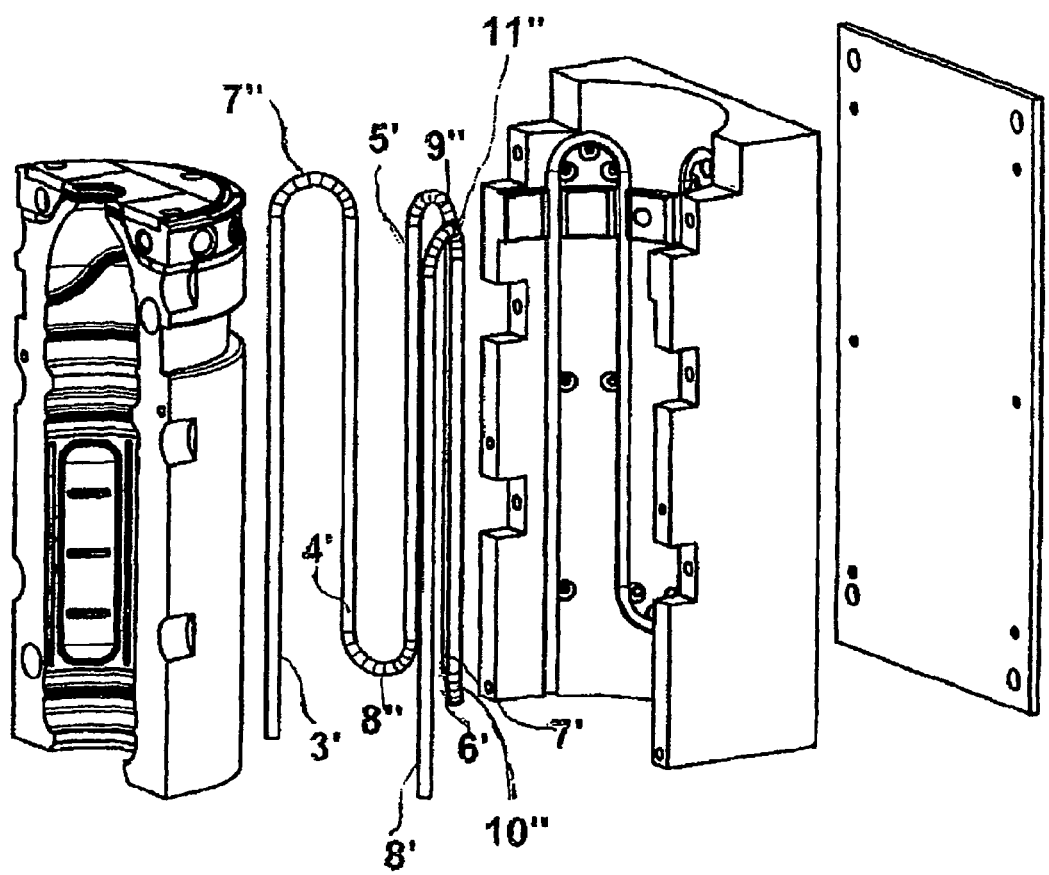
FIG. 2 shows an exploded perspective view of the assembly depicted in FIG. 1.

FIG. 1 shows a shell half (1) of the mould holder that houses a shell half (2) of the mould that, in turn, features an inside mould cavity shaped like the container (for example, a bottle) to be made. A thermally insulating wall (3) decreases the losses of heat, generated by the electric resistors, into the environment FIG. 2 shows, between the mould holder (1) and mould (2), the placement, near the mould (2), of a first set of tubular electric resistors, which are parallel to each other and to the generator of the inside cavity of the shell half (3', 4', 5', 6', 7', 8'), connected to each other by resistors (7", 8", 9", 10", 11'''), placed basically transversal to said first resistors. The spacing between said heating resistors depends on the power required to heat the inside mould cavity to the optimal temperature for blow moulding. The transversal heating elements (7", 8", 9", 10", 11"), or resistors, are placed near the end parts, top and bottom, of the mould. This placement is due to the fact that, to obtain perfect moulding results, it is necessary to have, in these areas, a certain amount of cooling (for example, to prevent distortions to the neck of the container or bottle) during forming and a greater amount of heat to compensate for the greater thermal dissipation caused by the significant curvature of the container.

Figure 3:
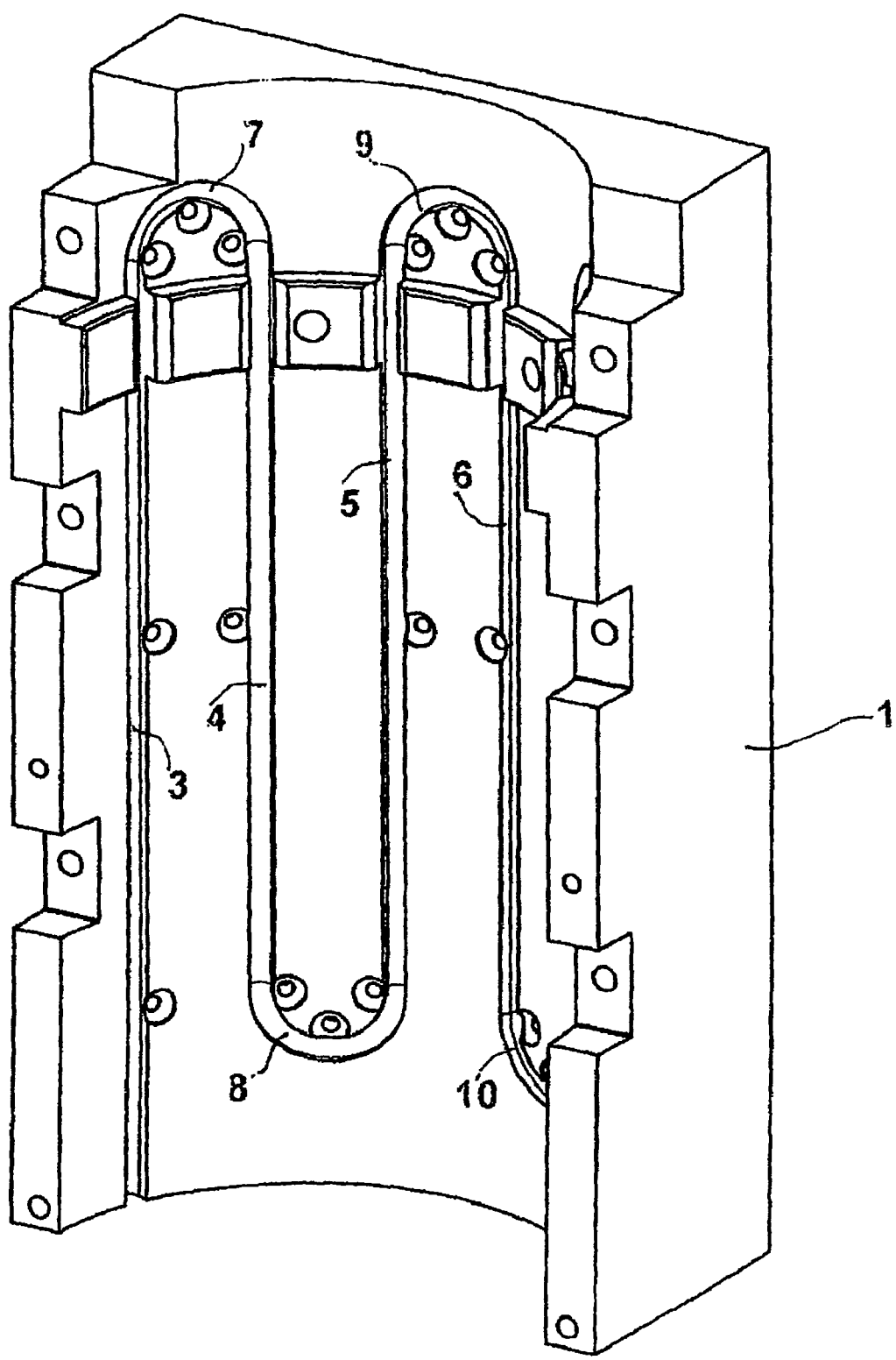
FIG. 3 shows a mould holder with a system of tubular electric resistors in accordance with the invention adhering to the inside surface of said mould holder.

Inside the shell half (1), there is another tubular resistor (3), together with a transversal resistor (7), of a second set of resistors, which is better shown in FIG. 3; the resistors of said second set are positioned analogously to the corresponding resistors of said first set.

Said first set of resistors can be eliminated, or disabled, if not required for the type of bottle to be made.

FIG. 3 shows a detail view of the housing of the different tubular (3, 4, 5, 6) and transversal (7, 8, 9, 10) electric resistors found on the inside wall of half the shell (1).

If a greater amount of heat is required along the side wall of the container to be moulded than in the neighbouring areas (for example, to make significant constrictions, or deformations, to the section of the container, or bottle, to be made), other transversal heating elements can be used in said areas. These additional elements can be similar to the others (7, 8, 9, 10), but some resistors (3, 4, 5, 6) can be shaped appropriately with loops. Obviously, said loops can be placed, without problem and as necessary, in every area of the mould.

Thus, it is easy to understand how tubular electric resistors, if necessary equipped with loops as specified above, connected to each other at the ends with transversal tubular electric resistors make it extremely simple to handle and control the production of containers, especially bottles, with the thermostabilizing treatment or heat-set process.

The invention claimed is:

1. A heated blow mould for making thermoplastic containers using the thermostabilizing treatment or heat-set process wherein a mould holder with a wall of a desired thickness is divided into two mirror shell halves each housing half a mould with a specific shape for making the container to be made and where, between said mould holder and said mould, at least a heating system is housed consisting of a set of first electric heating elements placed parallel to the generator of the container to be made and additional electric heating elements, which are basically transversal to said first elements and placed in areas where more heat must be supplied.

2. A heated mould as claimed in claim 1 wherein said first electric heating elements are tubular electric resistors and are arranged parallel to each other.

3. A heated mould as claimed in claim 1 wherein said first and said additional electric heating elements are electrically connected to each other.

4. A heated mould as claimed in claim 1 wherein said additional heating elements are placed at the top and bottom ends of the container to be made.

5. A mould as claimed in claim 1 wherein at least one of said heating systems is placed near the inside surface of the mould holder, while at least another of said heating systems is placed nearer the outside face of the mould.

6. A mould as claimed in claim 1 wherein a layer of thermally insulating material is placed at the outside surface of the mould holder.

* * * * *